Aug. 9, 1927.
C. GRUBBS
MITER BOX
Filed June 9, 1926
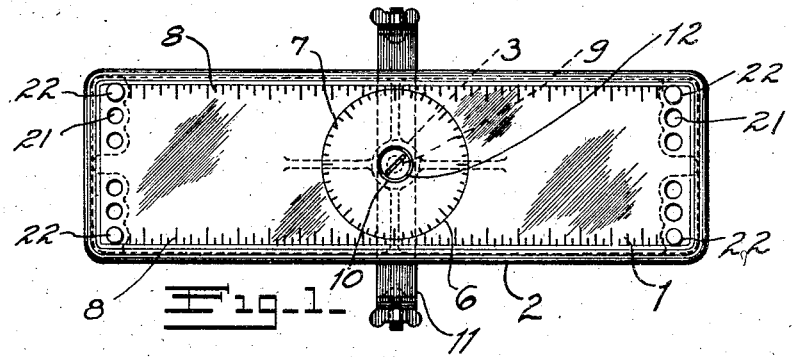
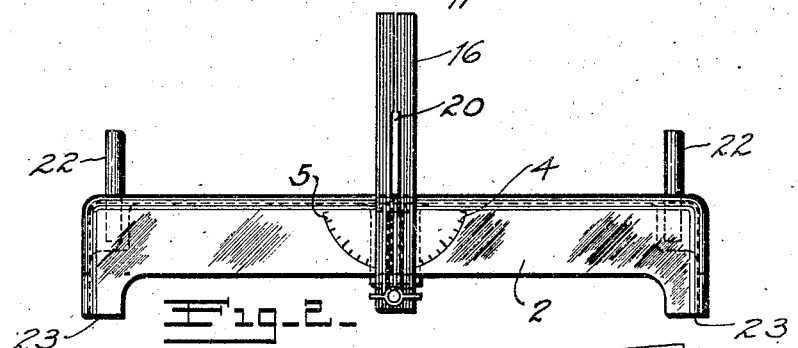
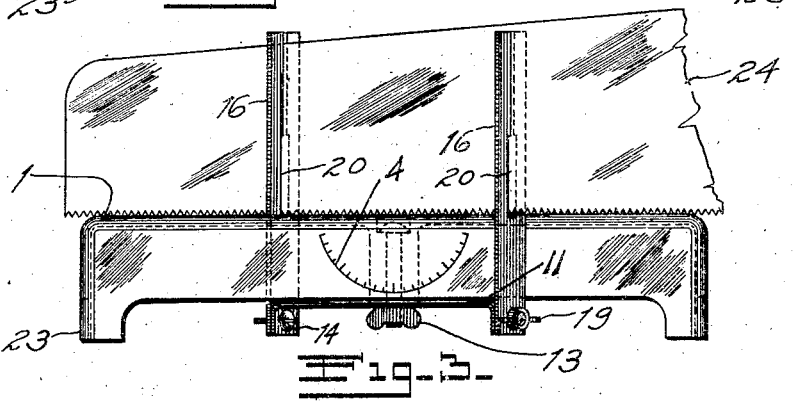
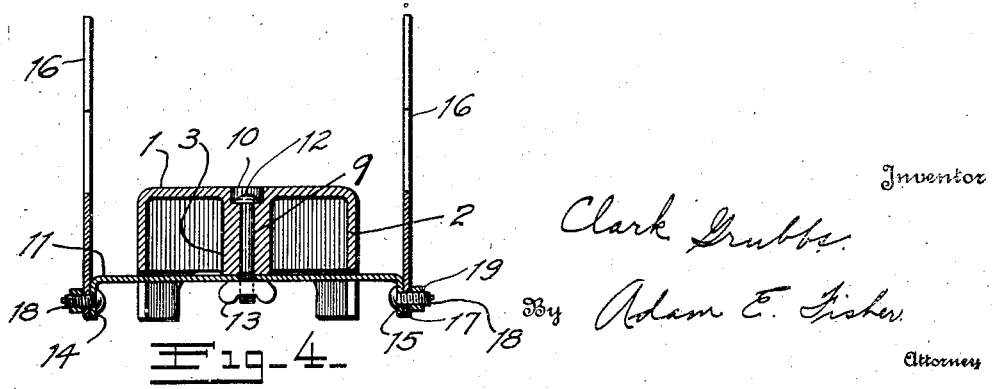
Inventor
Clark Grubbs.
By Adam E. Fisher
Attorney Patented Aug. 9, 1927.

1,638,011

UNITED STATES PATENT OFFICE.

CLARK GRUBBS, OF SANTA ANA, CALIFORNIA.

MITER BOX.

Application filed June 9, 1926. Serial No. 114,630.

This invention relates to improvements in miter boxes and has as its primary object the provision of a relatively simple device of this nature, adjustable for making miter cuts at various horizontal angles, and independently adjustable for making miter cuts at various vertical angles if desired to impart a bevel to the miter.

Another object of the device is to provide means wherein the horizontal and vertical angularity of the cut will be determined simultaneously with the adjustment of the device to make the cut, and indicated in degrees of a circle.

Other objects and advantages of the device will be apparent from the accompanying drawing and specification.

In the drawing:

Figure 1 is a plan view of the miter box.

Figure 2 is a side view of the miter box.

Figure 3 is a view of the miter box in use showing the device set for angular vertical cut.

Figure 4 is a detail of the adjustable members.

In constructing and assembling the elements of my invention I provide a table 1, preferably made of a light casting and being formed with downwardly turned flanges 2 and a central pivot bearing 3; the said flanges being of sufficient depth to permit the scribing of a semi-circle thereon as shown at 4. The said semi-circles 4 are graduated in degrees as shown at 5. A circle 6 is scribed in the center of the top surface of the table 1 and is graduated in degrees as shown at 7. The top of the table 1 along the side flanges 2 is graduated in to inches and fractions thereof as shown at 8. A bolt hole 9 is drilled thru the table 1 and the pivot bearing 3; the said hole being counter-sunk at its upper end as shown at 10. A swivel bar 11 is pivotally mounted to the underside of the pivot bearing 3 by means of a bolt 12 carrying a thumb nut 13 which is passed thru the bolt hole 9. The said swivel bar 11 is formed with downwardly directed flanges 14 pierced with apertures 15. Saw guides 16 pierced with apertures 17 are mounted on the flanges 14 of the swivel bar 11 by means of bolts 18 passed thru the apertures 15 and 17 and secured with thumb nuts 19. The said saw guides are provided with saw slots 20 for guiding the saw 24. The said slots extend downward to a point equal to the height of the table 1. A series of apertures 21 are drilled in the top of the table across the width of the same on either side of the circle 6, and are engaged by adjustment pins 22. Legs 23 are formed in the table at the corners thereof.

In use, a board is placed upon the table and centered thereon with the adjustment pins 22. The swivel bar is then set at the desired angle and secured in position by means of the thumb nut 13. With the saw guides in a vertical position the device is ready for making a miter cut with a vertical edge. If it is desired to make a miter cut with an angular edge, the saw guides are first set at the desired angle, and then the swivel bar is set to the angle of the desired miter cut.

While I have herein described a certain specific method of constructing and assembling the elements of my invention, it is understood same may be varied in minor details, not departing from the spirit of my invention as defined in the appended claim.

I claim:

In a miter box as described, the combination with a table, a lockable swivel bar pivoted to the underside of said table and adjustable saw guides releasably secured to said swivel bar, of a plurality of adjustment holes provided in said table in spaced relation to the longitudinal medial line of said table; and adjustment pins releasably engaging said adjustment holes, whereby the work may may be centered on said table with respect to said saw guides.

In testimony whereof I affix my signature.

CLARK GRUBBS.